United States Patent
G-Michael et al.

(10) Patent No.: US 10,049,295 B2
(45) Date of Patent: Aug. 14, 2018

(54) AUTOMATED CHANGE DETECTION FOR SYNTHETIC APERTURE SONAR

(71) Applicants: Tesfaye G-Michael, Panama City, FL (US); Daniel Sternlicht, Panama City, FL (US); Bradley Marchand, Santa Rosa Beach, FL (US); James Derek Tucker, Elgewood, NM (US); Timothy M. Marston, Seattle, WA (US)

(72) Inventors: Tesfaye G-Michael, Panama City, FL (US); Daniel Sternlicht, Panama City, FL (US); Bradley Marchand, Santa Rosa Beach, FL (US); James Derek Tucker, Elgewood, NM (US); Timothy M. Marston, Seattle, WA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 144 days.

(21) Appl. No.: 15/235,251

(22) Filed: Aug. 12, 2016

(65) Prior Publication Data
US 2018/0046880 A1 Feb. 15, 2018

(51) Int. Cl.
*G06K 9/00* (2006.01)
*G06K 9/46* (2006.01)
*G06T 7/00* (2017.01)

(52) U.S. Cl.
CPC ....... *G06K 9/4671* (2013.01); *G06K 9/00543* (2013.01); *G06T 7/0057* (2013.01); *G06T 2207/30212* (2013.01)

(58) Field of Classification Search
CPC . G06K 9/4671; G06K 9/00543; G06T 7/0057
See application file for complete search history.

(56) References Cited

U.S. PATENT DOCUMENTS 5,563,601 A * 10/1996 Cataldo .................. G01S 13/52
342/113

OTHER PUBLICATIONS

G-Michael, Tesfaye, Marchand, Bradley, Tucker, J. Derek, Sternlicht, Daniel D., Martston, Timothy M. "Automated change detection for synthetic aperture sonar" SPIE 2014.*

* cited by examiner

*Primary Examiner* — Kim Vu
*Assistant Examiner* — Molly Delaney
(74) *Attorney, Agent, or Firm* — James T. Shepherd

(57) ABSTRACT

Methods and systems detect changes occurring over time between synthetic aperture sonar (SAS) images. A processor performs coarse navigational alignment, fine-scale co-registration and local co-registration between current image data and historical image data. Local co-registration includes obtaining correlation peaks for large neighborhood non-overlapping patches. Relative patch translations are estimated and parameterized into error vectors. Interpolation functions formed from the vectors re-map the current image onto the same grid as the historical image and the complex correlation coefficient between images is calculated. The resulting interferogram is decomposed into surge and sway functions used to define the argument of a phase function, which is multiplied by the current image to remove the effects of surge and sway on the interferogram. Based on the aforementioned computations, a canonical correlation analysis is performed to detect scene changes between the historical and new SAS images.

9 Claims, 5 Drawing Sheets

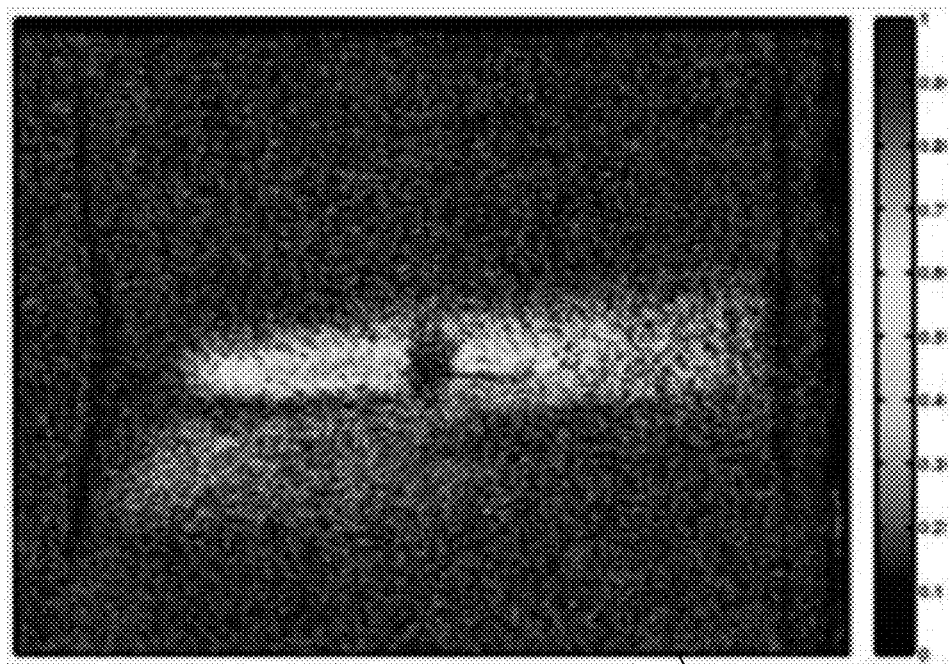
FIG. 4C — 500
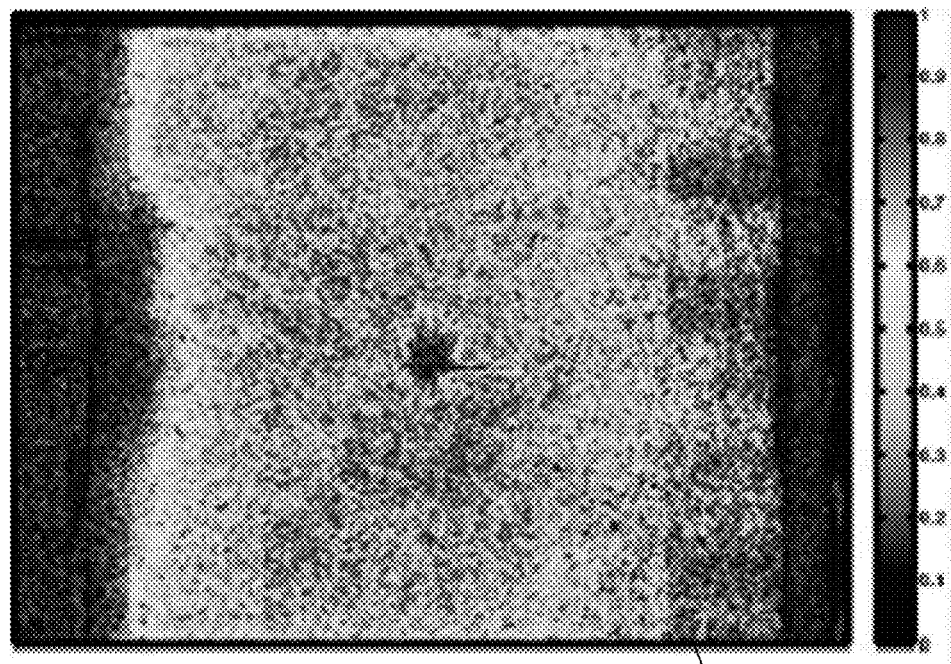
FIG. 4D — 600

AUTOMATED CHANGE DETECTION FOR SYNTHETIC APERTURE SONAR

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to change detection. More particularly, the present invention relates to methods and systems to detect changes in sonar images.

(2) Description of the Prior Art

The placement of sea-floor mines and underwater improvised explosive devices by hostile forces has been recognized as a significant threat to navigation. To successfully and effectively mitigate this threat in harbor waters, ports and waterways, it is required to conduct periodic sonar image surveys to try and detect any newly inserted objects.

Object detection can be accomplished by comparing newly obtained images with historical imaging data using coherent/incoherent sonar image correlation. By correlating co-registered temporally separated images using amplitude and phase information, subtle changes can be identified. Thus, man-made changes in the seafloor that are associated with the placement of mines or other objects implanted on the seafloor can be identified.

Change detection through coherent/incoherent sonar image correlation is widely regarded as a difficult problem due to the tendency of sonar images to change dramatically in response to aspect angle and the difficulty of precisely co-registering the repeat-pass survey images. Thus, a need has been recognized in the state of the art to develop innovative motion estimation techniques in order to improve reliability and fidelity of synthetic aperture sonar (SAS) imagery.

There is a further need to provide a means to increase the operation envelope of SAS systems by relieving environmental limitations. In addition, there is a need to reduce costs by developing motion estimation techniques that can be completed without inertial navigation system (INS) data.

SUMMARY OF THE INVENTION

It is therefore a general purpose and primary object of the present invention to provide methods and systems for automated change detection in SAS images. The methods and systems compare new and historical seafloor SAS images for changes occurring over time.

The methods and systems consist of four stages. The first stage includes a coarse navigational alignment that relates and approximates pixel locations of historical and current datasets with the multi-stage co-registration. The second stage includes a fine-scale co-registration using the scale invariant feature transform (SIFT) algorithm to match features between overlapping datasets. The third stage includes local co-registration that improves phase coherence. The fourth and last stage includes change detection utilizing a canonical correlation analysis (CCA) algorithm to detect changes.

The methods and systems described herein improve reliability and fidelity of synthetic aperture sonar (SAS) imagery comparisons. In one instance, these systems and methods reduce the workload of a human operator tasked with identifying anomalies in side-scan sonar images. In so doing, the systems and methods can increase the detection capability of SAS image comparison. In addition, by reducing the human workload, the systems and methods can effectively increase the operation envelope of SAS systems by relieving environmental limitations. Further, costs can be reduced as the systems and methods described herein can be completed without inertial navigation system (INS) data.

In one embodiment, a method of detecting changes between a current image of an area and a historical image of the area includes relating pixel locations of the current and historical images, performing fine-scale co-registration of the current and historical images, performing local co-registration of the images based on optimizing inter-scene phase coherence of the images and performing a canonical correlation analysis based on said local co-registration. Prior to relating pixel locations, the method includes retrieving the historical image from a database based on the current and historical images having corresponding geographical locations. In addition, performing fine-scale co-registration includes applying a scale invariant feature transform to the images.

In performing the local co-registration, the method includes performing non-overlapping patch correlation, obtaining correlation peaks for each patch, estimating local relative patch translations in along-track and across-track dimensions, parameterizing along-track translations into surge and heading error vectors, parameterizing across-track translations into and heave and sway error vectors and re-mapping the current image onto a grid corresponding to said the image based on interpolation functions formed from the surge, heading, sway and heave vectors.

Local co-registration further includes, calculating a coefficient of a complex correlation between the current image and the historical image. A phase of the complex correlation forms an interferogram, which can be decomposed into surge and sway functions. An argument of a phase function can be defined based on the surge and sway functions and the phase function can be multiplies by the current image.

In calculating a complex correlation coefficient, the method can utilize a sliding pixel area, which can be on the order of ten pixels by ten pixels. In performing the non-overlapping patch correlation, the method can utilize patches on the order of fifty pixels by fifty pixels.

In one embodiment, a sonar image change detection system includes a synthetic aperture sonar image forming apparatus, a database containing historic sonar images and a processor in communication with said apparatus and said database. Computer readable medium disposed within the processor can contain instructions for the processor to retrieve one of the historical images from the database based on the historical image having a geographical location corresponding to that of a current image received from the apparatus.

The instructions can include relating pixel locations of the current and historical images, performing fine-scale co-registration of the images, performing local co-registration of the images based on said optimizing inter-scene phase coherence of the images and performing a canonical correlation analysis based on the local co-registration.

The instructions to perform the local co-registration can include performing non-overlapping patch correlation, wherein each said patch can be on the order of fifty pixels by fifty pixels. Instructions can include obtaining correlation peaks for each patch, estimating local relative patch translations in along-track and across-track dimensions, parameterizing along-track translations into surge and heading error vectors, parameterizing across-track translations into and heave and sway error vectors and re-mapping the current image onto a grid corresponding to the historical image based on interpolation functions formed from the surge, heading, sway and heave vectors.

The instructions can further include calculating a complex correlation coefficient between the current image and the historical image based on a sliding pixel area on an order of ten pixels by ten pixels. A phase of the complex correlation forms an interferogram, which is decomposed into surge and sway functions, defining an argument of a phase function based on the surge and sway functions. The phase function is multiplied by the current image. Further instructions apply a scale invariant feature transform to the current image and the historical image in performing the fine-scale co-registration.

In one embodiment, a method of performing local co-registration of a current SAS image of a scene and a historical SAS image of said scene includes optimizing inter-scene phase coherence of the current image and the historical image, performing non-overlapping patch correlation based on said optimizing, wherein each patch can be on the order of fifty pixels by fifty pixels.

The method further includes obtaining correlation peaks for each patch, estimating local relative patch translations in along-track and across-track dimensions, parameterizing along-track translations into surge and heading error vectors, parameterizing across-track translations into heave and sway error vectors and re-mapping the current image onto a grid corresponding to the historical image based on interpolation functions formed from the surge, heading, sway and heave vectors.

In addition, the method includes calculating a complex correlation coefficient between the current image and the historical image based on a sliding pixel area on the order of ten pixels by ten pixels. A phase of the complex correlation forms an interferogram, which is decomposed into surge and sway functions, defining an argument of a phase function based on the surge and sway functions. The phase function is multiplied by the current image.

The method can include performing a canonical correlation analysis based on the local co-registration and determining changes between the current image and the historical image based on the correlation analysis. Prior to optimizing inter-scene phase coherence, the method can also include retrieving the historical image from a database based on the current image and the historical image having corresponding geographical locations.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like references numerals and symbols designate identical or corresponding parts throughout the several views and wherein:

FIGS. 4A and 4D illustrate respective historical and current SAS images; and

FIGS. 4C and 4D illustrate coherence map results.

DESCRIPTION OF THE INVENTION

Figure 1:
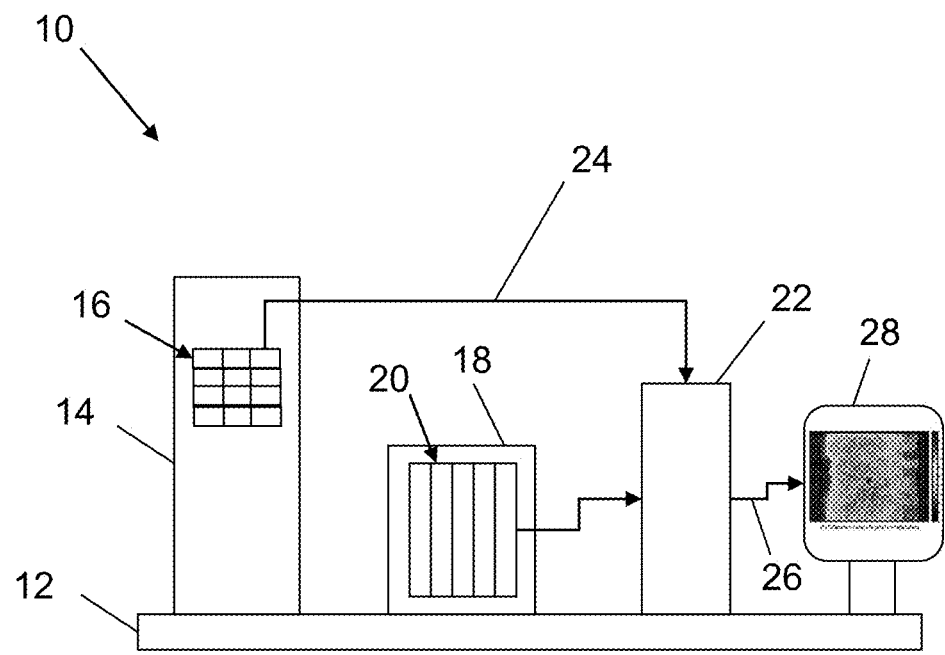
FIG. 1 illustrates a schematic view of an automated change detection system for synthetic aperture sonar (SAS) imagery comparisons.
Figure 1:
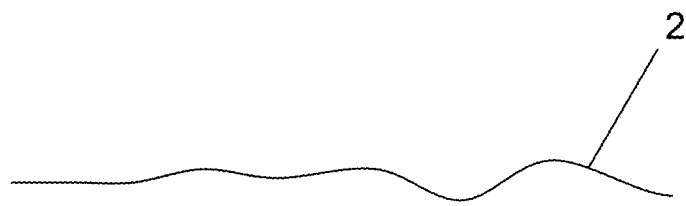

Referring now to FIG. 1, there is shown a schematic view of automated change detection system 10. Platform 12 includes synthetic aperture sonar (SAS) apparatus 14 to form new SAS images 16 of bottom 2, in a manner well known to those of skill in the art. Database 18 contains historical image data 20 for one or more previous SAS images. Historical image data 20 for each of the previous SAS images is associated with the respective geographical location for said image.

Processor 22 receives current image data 24 for one of the new SAS images 16. Processor 22 then retrieves historical image data 20 from database 18 corresponding to the same geographical location as the current image data 24. As described in further detail hereinafter, processor 22 performs coarse navigational alignment, fine-scale co-registration and local co-registration between current image data 24 and historical image data 20. Based on the aforementioned computations, processor 22 utilizes a canonical correlation analysis (CCA) to detect scene changes between the historical and new SAS images and output results 26 to display 28.

Figure 2:
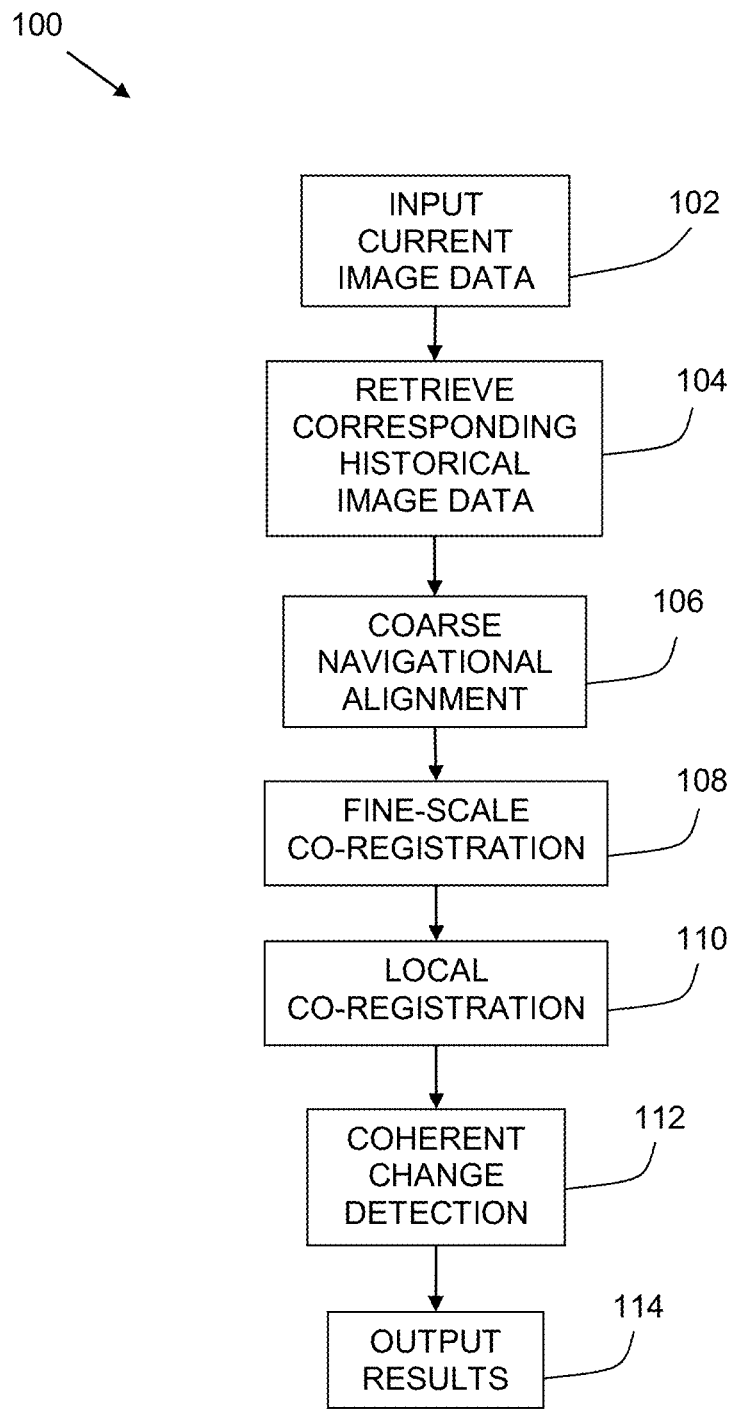
FIG. 2 illustrates a block diagram of an automated change detection method for SAS imagery.

Referring now also to FIG. 2, there is illustrated a block diagram of method 100 for automated change detection in SAS images. At block 102, current image data 24 is input to processor 22. Based on the geographical location associated with current image data 24, processor 22 retrieves historical image data 20 from database 18 having a corresponding geographical location (block 104).

Block 106 performs coarse navigational alignment, relating and approximating pixel locations of historical image data 20 and current image data 24. Block 108 performs fine-scale co-registration using the scale invariant feature transform (SIFT) algorithm. As is known to those of skill in the art, the SIFT algorithm is used to match features between overlapping datasets.

As discussed in more detail hereinafter, block 110 performs local co-registration through optimizing the inter-scene phase coherence. Block 112 performs coherent change detection to detect scene changes between current and historical images. As is known to those of skill in the art, a canonical correlation analysis (CCA) algorithm can be used for coherent change detection. Block 114 outputs the resulting coherence map.

Figure 3:
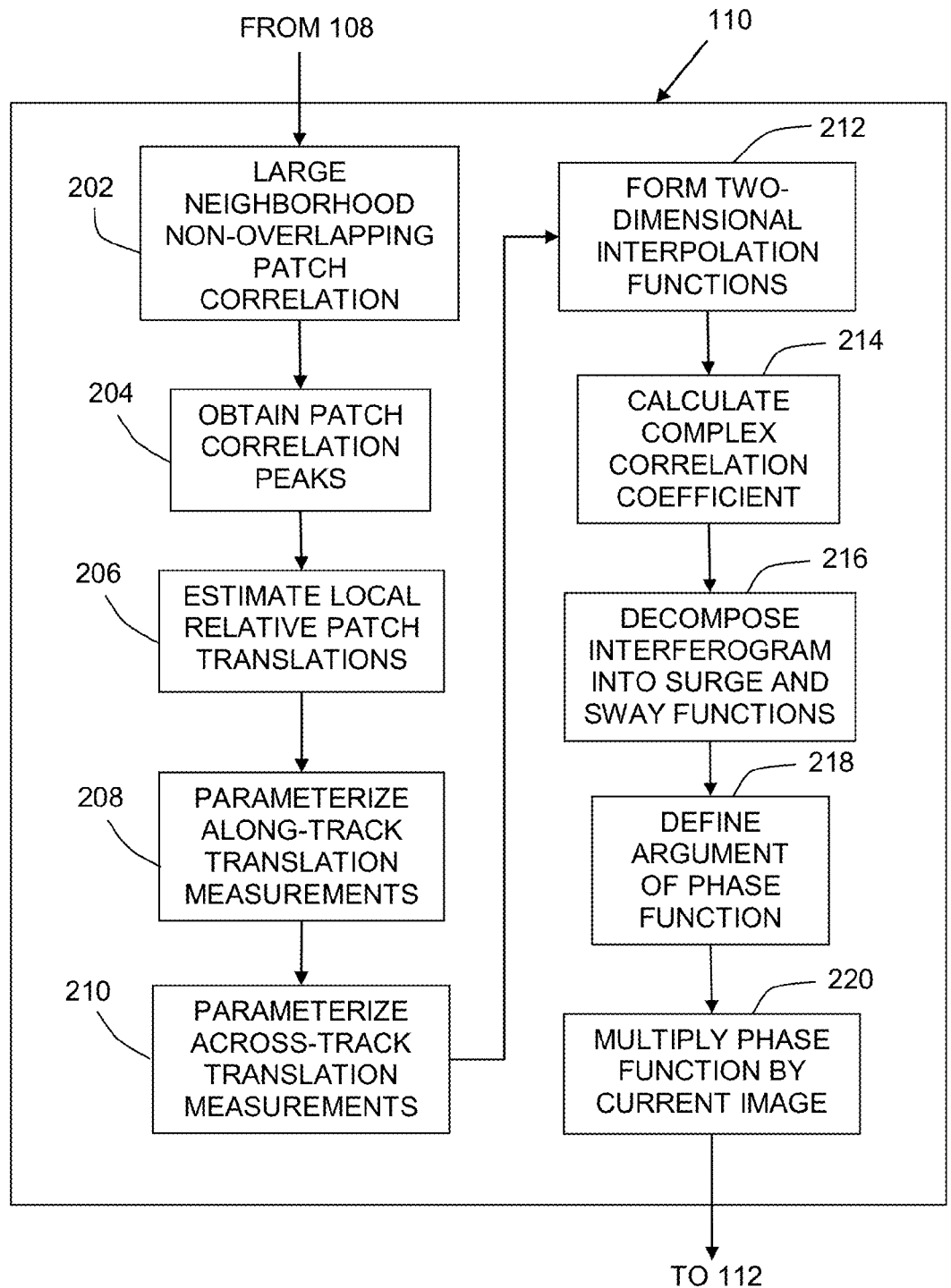
FIG. 3 illustrates a block diagram of local co-registration.

Referring now also to FIG. 3, there is illustrated a detailed block diagram of local co-registration block 110. Using the results of the fine-scale co-registration of block 108, large neighborhood non-overlapping patch correlation is performed at block 202. The correlation peaks for each patch are obtained at block 204 and the local relative patch translations in the along-track (x) and across-track (y) dimensions to local precision are estimated through parabolic interpolation (block 206).

Block 208 parameterizes local along-track translation measurements as a series of coarse surge and heading errors relating the geometries of the synthetic apertures. In a similar manner, block 210 parameterizes across-track translation measurements as a series of heave (vertical translation) and sway (horizontal translation) errors.

The surge, heading, sway and heave vectors are used to form two-dimensional interpolation functions for re-mapping the current image onto the same grid as the historical image, correcting for local registration errors (block 212).

The complex correlation coefficient between images is calculated using a sliding, small neighborhood pixel area (block 214).

The phase of the complex correlation forms an interferogram which is unwrapped. Block 216 decomposes the interferogram into surge and sway functions. The surge and sway functions are used to define the argument of a phase function (block 218). The phase function is multiplied by the current image to remove the effects of surge and sway on the interferogram formed between the historical and current images (block 220). As previously described, block 112 uses the results of block 110 to detect scene changes.

Figure 4A:
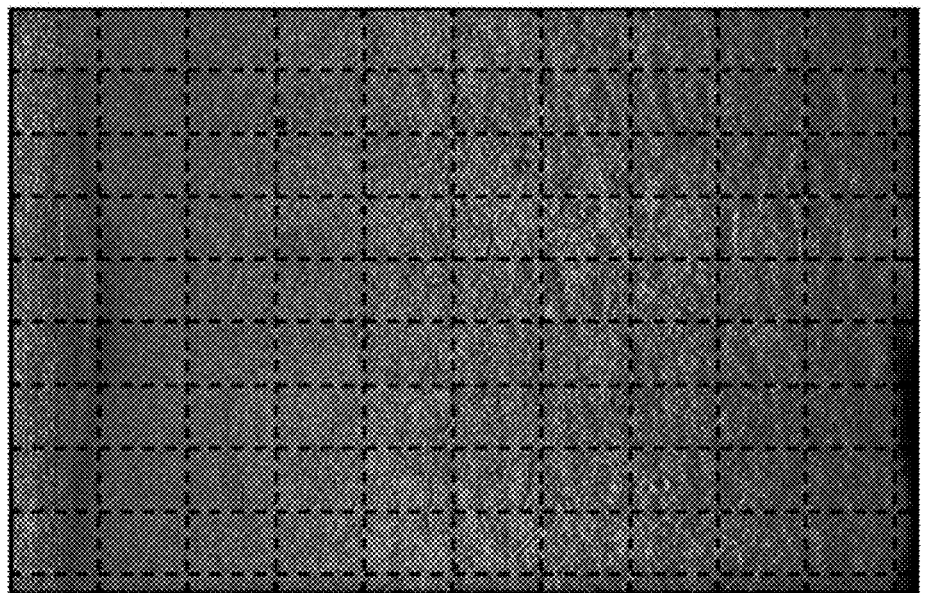
Figure 4B:
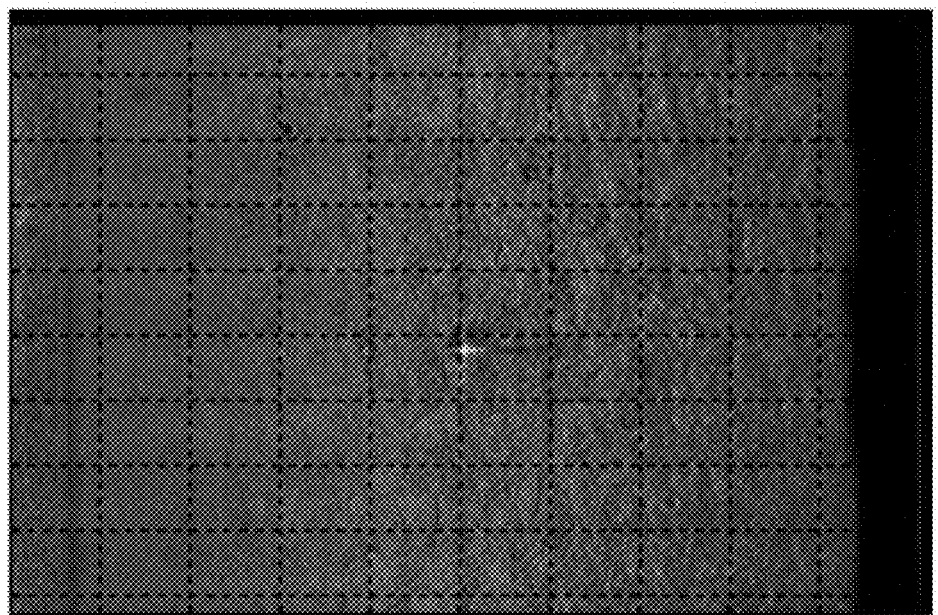

Referring now to FIG. 4A, there is shown an exemplary historical SAS image 300. Historical image 300 shows a flat sand region with sparse structure. Such regions pose difficulties for image registration due to temporal instability of the base image structure. Referring to FIG. 4B, there is shown an exemplary current SAS image 400. Current image 400 was formed with platform 12 following the same track as when historical image 300 was formed, with approximately two hours difference between passes. In order to introduce change, a 55-gallon drum was inserted between passes, as seen by the small anomaly near the center of FIG. 4B.

Referring now to FIG. 4C, there is shown first coherence map 500 of images 300 and 400 after blocks 102 through 108 of method 100 are performed. The 55 gallon drum can be somewhat discerned near the center of FIG. 4C. Referring to FIG. 4D, there is shown final coherence map 600 resulting from applying local co-registration (block 110). As seen, there is a noted difference in the contrast between the 55 gallon drum and the surrounding area corresponding to sediment back-scatter. Applying the CCA algorithm at block 112 to image 600 easily identifies the changes in scene between historical image 300 and current image 400.

What have thus been described are systems and methods for automated change detection in SAS images. The systems and methods compare new and historical seafloor SAS images for changes occurring over time. Typically, change detection is applied to situations where the same area is to be repeatedly monitored, such as surveys for port and harbor security. The systems and methods described herein provide for efficient resource management through the enhancement of automatic target recognition algorithms. Automatic change detection can increase detection capability and reduce the workload of a human operator tasked with identifying anomalies in side-scan sonar images.

In operation, synthetic aperture sonar (SAS) apparatus 14 forms SAS images 16 of a scene. Current image data 24 based on SAS images 16 is received by processor 22. Processor 22 retrieves historical image data 20 from database 18 corresponding to the same geographical location as the current image data 24.

As described with respect to method 100, processor 22 performs coarse navigational alignment (block 106), fine-scale co-registration (block 108) and local co-registration (block 110) between current image data 24 and historical image data 20. Based on the aforementioned computations, processor 22 utilizes a canonical correlation analysis (CCA) to detect scene changes between the historical and new SAS images (block 112) and to output results 26 to display 28 (block 114).

With respect local co-registration (block 110), large neighborhood non-overlapping patch correlation is performed (block 202) and correlation peaks for each patch are obtained (block 204). The local relative patch translations in the along-track (x) and across-track (y) dimensions are estimated (block 206) and the along-track and across-track translation measurements are parameterized into respective surge and heading errors (block 208) and heave and sway errors (block 210).

Interpolation functions formed from the surge, heading, sway and heave vectors re-map the current image onto the same grid as the historical image (block 212) and the complex correlation coefficient between images is calculated (block 214). The resulting interferogram is decomposed into surge and sway functions (block 216), which are used to define the argument of a phase function (block 218). The phase function is multiplied by the current image to remove the effects of surge and sway on the interferogram formed between the historical and current images (block 220). Change detection techniques can be used on the resulting coherence map to detect scene changes between current and historical images.

Obviously many modifications and variations of the present invention may become apparent in light of the above teachings. For example, database 18, processor 22 and display 28 may be remote from each and from platform 12 and apparatus 14. One or more of the connections between processor 22 and apparatus 14, database 18, or display 28 may be wireless or hard wired.

Additionally, the large neighborhood and small neighborhood referred to at blocks 202 and 214, respectively can be varied to suit the image data and computational limitations of system 10. Exemplary values for a large neighborhood patch would be 50×50 pixels. For a small neighborhood, an area of 10×10 pixels can be used.

Further, the configuration of blocks in method 100 can be changed to suit the requirements of processor 22. Also, the systems and methods described herein may be configured for use with radar images.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A method of detecting changes between a current image of an area and a historical image of said area, wherein said current image is taken at a time later than said historical image, said method comprising:

retrieving said historical image from a database based on said current image and said historical image having corresponding geographical locations;

relating pixel locations of said current image and said historical image;

performing fine-scale co-registration of said current image and said historical image;

optimizing inter-scene phase coherence of said current image and said historical image;

performing local co-registration of said current image and said historical image based on said optimizing; and performing a canonical correlation analysis based on said local co-registration;

wherein performing fine-scale co-registration further comprises applying a scale invariant feature transform to said current image and said historical image; and wherein performing local co-registration further comprises:

performing non-overlapping patch correlation;

obtaining correlation peaks for each said patch;

estimating local relative patch translations in along-track and across-track dimensions;

parameterizing along-track translations into surge and heading error vectors;
parameterizing across-track translations into heave and sway error vectors;
re-mapping said current image onto a grid corresponding to said historical image based on interpolation functions formed from said surge, heading, sway and heave vectors;
calculating a coefficient of a complex correlation between said current image and said historical image, a phase of said complex correlation forming an interferogram;
decomposing said interferogram into surge and sway functions;
defining an argument of a phase function based on said surge and sway functions; and
multiplying said phase function by said current image.

2. The method of claim 1, wherein calculating a coefficient further comprises utilizing a sliding pixel area.

3. The method of claim 2, wherein said sliding pixel area is on an order of ten pixels by ten pixels.

4. The method of claim 1, wherein said non-overlapping patch correlation further comprises utilizing patches on an order of fifty pixels by fifty pixels.

5. A sonar image change detection system, comprising:
a synthetic aperture sonar image forming apparatus;
a database containing historic sonar images;
a processor in communication with said apparatus and said database; and
computer readable medium disposed within said processor, said computer readable medium containing instructions for said processor to perform the steps of:
retrieving one of said historical images from said database based on said one historical image and a current image received from said apparatus having corresponding geographical locations;
relating pixel locations of said current image and said historical image;
performing fine-scale co-registration of said current image and said historical image;
optimizing inter-scene phase coherence of said current image and said historical image;
performing local co-registration of said current image and said historical image based on said optimizing; and
performing a canonical correlation analysis based on said local co-registration;
wherein said computer readable medium contains further instructions to perform said local co-registration comprising instructions for said processor to perform the steps of:
performing non-overlapping patch correlation, each said patch being on an order of fifty pixels by fifty pixels;
obtaining correlation peaks for each said patch;
estimating local relative patch translations in along-track and across-track dimensions;
parameterizing along-track translations into surge and heading error vectors;
parameterizing across-track translations into heave and sway error vectors;
re-mapping said current image onto a grid corresponding to said historical image based on interpolation functions formed from said surge, heading, sway and heave vectors;
calculating a coefficient of a complex correlation between said current image and said historical image based on a sliding pixel area on an order of ten pixels by ten pixels, a phase of said complex correlation forming an interferogram;
decomposing said interferogram into surge and sway functions;
defining an argument of a phase function based on said surge and sway functions; and
multiplying said phase function by said current image.

6. The system of claim 5, wherein said computer readable medium contains further instructions for applying a scale invariant feature transform to said current image and said historical image to perform said fine-scale co-registration.

7. A method of performing local co-registration of a current synthetic aperture sonar image of a scene and a historical synthetic aperture sonar image of said scene, comprising:
optimizing inter-scene phase coherence of said current image and said historical image;
performing non-overlapping patch correlation based on said optimizing, each said patch being on an order of fifty pixels by fifty pixels;
obtaining correlation peaks for each said patch;
estimating local relative patch translations in along-track and across-track dimensions;
parameterizing along-track translations into surge and heading error vectors;
parameterizing across-track translations into heave and sway error vectors;
re-mapping said current image onto a grid corresponding to said historical image based on interpolation functions formed from said surge, heading, sway and heave vectors;
calculating a coefficient of a complex correlation between said current image and said historical image based on a sliding pixel area on an order of ten pixels by ten pixels, a phase of said complex correlation forming an interferogram;
decomposing said interferogram into surge and sway functions;
defining an argument of a phase function based on said surge and sway functions; and
multiplying said phase function by said current image.

8. The method of claim 7, further comprising:
performing a canonical correlation analysis based on said local co-registration; and
determining changes between said current image and said historical image based on said correlation analysis.

9. The method of claim 8 further comprising, prior to optimizing inter-scene phase coherence, retrieving said historical image from a database based on said current image and said historical image having corresponding geographical locations.

* * * * *